(12) United States Patent
Crabtree

(10) Patent No.: US 9,842,508 B2
(45) Date of Patent: Dec. 12, 2017

(54) ONLINE INTERACTIVE FITNESS TRAINER

(71) Applicant: Cory Crabtree, Wyndmoor, PA (US)

(72) Inventor: Cory Crabtree, Wyndmoor, PA (US)

(73) Assignee: Get Into Fit LLC, Wyndmoor, PA (US)

( * ) Notice: Subject to any disclaimer, the term of this patent is extended or adjusted under 35 U.S.C. 154(b) by 164 days.

(21) Appl. No.: 14/196,375

(22) Filed: Mar. 4, 2014

(65) Prior Publication Data

US 2014/0248595 A1    Sep. 4, 2014

Related U.S. Application Data

(60) Provisional application No. 61/772,081, filed on Mar. 4, 2013.

(51) Int. Cl.
*G09B 9/00* (2006.01)
*A63B 69/00* (2006.01)
*G09B 5/08* (2006.01)

(52) U.S. Cl.
CPC ..................... *G09B 5/08* (2013.01)

(58) Field of Classification Search
USPC ........................................... 434/247
See application file for complete search history.

(56) References Cited

U.S. PATENT DOCUMENTS

2011/0212424 A1    9/2011 Smith

*Primary Examiner* — Kesha Frisby
(74) *Attorney, Agent, or Firm* — Duane Morris LLP

(57) ABSTRACT

A method, and corresponding system, for providing a fitness program to remote subscribers includes receiving first data related to a fitness program. A virtual fitness session having a set of remote subscribers is established. An online fitness coach is assigned to the set of remote subscribers in the virtual fitness session. Second data, including audio and/or video data related to the first fitness program, is transmitted to the set of remote subscribers in the virtual fitness session. Feedback is provided from each remote subscriber to the online fitness coach. The feedback enables the online fitness coach to monitor in live-time third data regarding performance of each remote subscriber in the virtual fitness session. The method further includes communicating between the online fitness coach and the set of remote subscribers. The communication enables the online fitness coach to send fourth data to one or more of the remote subscribers in live-time.

17 Claims, 6 Drawing Sheets

ONLINE INTERACTIVE FITNESS TRAINER

CROSS-REFERENCE TO RELATED APPLICATION

This application claims priority under 35 U.S.C. §119(e) from U.S. Provisional Application Ser. No. 61/772,081 filed Mar. 4, 2013, the entirety of which is hereby incorporated by reference herein.

BACKGROUND

The present subject matter is generally directed to interconnected computers, computer networks, audio and video equipment simultaneously broadcasting a fitness class to remote subscribers, each of whom interacts with a live online coach within a virtual fitness session.

As the fitness industry struggles to keep pace with a population growing more unhealthy and overweight, conventional systems and methods attempt to motivate individuals to exercise or workout at a gym. For many individuals, however, there are many reasons the individual would rather exercise at home than at the gym, e.g., scheduling issues, costs associated with gym memberships, drive time to the gym, and overall flexibility. Fitness clubs, gyms, studios and independent boot camps have thus begun to offer web-based instruction and on-demand fitness videos; however, most participants still struggle to see any consistent results. Further, a negative aspect of not exercising in a gym is that the individual will be unable to enjoy the camaraderie of the gym setting. Thus, conventional systems and methods do not address commitment and accountability issues for respective individuals but appear to focus on providing more diverse offerings at gyms, more fitness videos and DVDs, and/or simple online instructions.

SUMMARY

In view of these needs, embodiments of the present subject matter may thus provide methods and systems of providing physical fitness classes that allow close interaction with a remote individual or client to achieve consistent results by streaming live or pre-recorded fitness classes over a network, e.g., the Internet. Exemplary embodiments provide a high degree of interactivity to an individual through the addition of a live online fitness coach who greets each online participant at the same time a studio or fitness instructor greets clients arriving at the physical studio location. Such embodiments providing an online method of delivering fitness classes with live online coaching may appeal to many more people who are unable to attend studio fitness classes due to various reasons, e.g., child responsibilities, work schedules, weather-related delays, business travel, intimidation of a fitness studio environment, etc.

It is thus an aspect of some embodiments of the present subject matter to provide accountability for a client through integration of live, dedicated online coaches awaiting subscribers to log in. It is another aspect of embodiments of the present subject matter to provide a conducive environment for someone to learn and practice consistency in his or her fitness journey by creating an environment whereby a live online coach teaches subscribers how to practice and remain consistent as a function of encouragement before, during and after the workout session.

It is also an aspect of embodiments of the present subject matter to provide clear instructions on how to perform each and every exercise during the workout especially for those persons unfamiliar with exercise routines. Exemplary embodiments may provide online sessions with studio demonstrations before the beginning of each exercise in addition to a live online coach providing real-time feedback regarding how exercises should be performed as the workout progresses. Additional aspects of embodiments of the present subject matter include providing personal interactivity with a plurality of online subscribers through two-way interactive video and audio communication with each subscriber who has an appropriately functioning input device, e.g., microphone, camera (e.g., webcam), biometric sensor, or other input device.

A further aspect of embodiments of the present subject matter may also provide technical support for online subscribers wishing to connect to the online fitness classes through the use of a dedicated technical staff providing setup instructions and full live testing with each subscriber before attempts to connect to a online fitness session are made. Another aspect of embodiments of the present subject matter may create and encourage instructor-to-client bonds essential for remaining committed to a fitness lifestyle. This aspect is provided using a live online coach who works to build a personal bond and camaraderie with each subscriber dramatically shifting the focus away from just another exercise regime toward an ongoing fitness lifestyle.

Thus, one embodiment of the present subject matter provides a method for providing a fitness program to remote users. The method may comprise receiving first data from a first source, the first data related to a first fitness program, and establishing a first virtual fitness session having a first set of remote subscribers. The method may also include assigning a first online fitness coach to the first set of remote subscribers in the first virtual fitness session. Second data may then be transmitted from a second source to the first virtual fitness session, the second data including data related to the first fitness program.

In another embodiment, a method for providing a fitness program to remote subscribers includes receiving first data related to a first fitness program. A first virtual fitness session having a first set of remote subscribers is established. A first online fitness coach is assigned to the first set of remote subscribers in the first virtual fitness session. Second data is transmitted to the first set of remote subscribers in the first virtual fitness session. The second data includes at least one of audio data and video data related to the first fitness program. Feedback is provided from each remote subscriber in the first set to the first online fitness coach. The feedback enables the first online fitness coach to monitor in live-time third data regarding performance of each remote subscriber in the first virtual fitness session. The method further includes communicating between the first online fitness coach and the first set of remote subscribers. The communication enables the first online fitness coach to send fourth data to one or more of the remote subscribers in the first set in live-time.

In another embodiment, a computer system for providing a fitness program to remote users comprises a computer readable storage medium encoded with computer program code, and a processor electrically coupled with the computer readable storage medium. The processor is configured to execute the computer program code for providing a fitness program to remote users. The computer program code is arranged to cause the processor to perform one or more operations or steps of a method for providing a fitness program to remote subscribers. For example, the program code, when executed, may cause the processor to: receive first data related to a first fitness program; establish a first virtual fitness session having a first set of remote subscribers; transmit second data to the first set of remote subscribers in the first virtual fitness session, the second data including at least one of audio data and video data related to the first fitness program; receive feedback from each remote subscriber in the first set at a first online fitness coach assigned to the first set of remote subscribers in the first virtual fitness session, the feedback enabling the first online fitness coach to monitor in live-time third data regarding performance of each remote subscriber in the first virtual fitness session; and communicate between the first online fitness coach and the first set of remote subscribers, wherein the communication enables the first online fitness coach to send fourth data to one or more of the remote subscribers in the first set in live-time.

Another embodiment of the present subject matter provides a computer system for providing a fitness program to remote users. The system may include computer readable storage medium being encoded with computer program code and a processor electrically coupled with the computer readable storage medium, the processor being configured to execute the computer program code for providing a fitness program to remote users. The computer program code may be arranged to cause the processor to receive first data from a first source, the first data related to a first fitness program and establish a first virtual fitness session having a first set of remote users. The processor may also be configured to assign a first online fitness coach to the first set of remote users in the first virtual fitness session and transmit second data from a second source to the first virtual fitness session, the second data including data related to the first fitness program.

In another embodiment, a method for providing a fitness program to remote subscribers includes transmitting first data to a first set of remote subscribers in a first virtual fitness session. The first data includes at least one of audio data and video data related to a first fitness program. Feedback is provided from each remote subscriber in the first set to an first online fitness coach assigned to the first set of remote subscribers. The feedback enables the first online fitness coach to monitor in live-time second data regarding performance of each remote subscriber in the first virtual fitness session. The method includes displaying to at least one remote subscriber in the first set the second data regarding the performance of said at least one remote subscribes. The method includes communicating between the first online fitness coach and the first set of remote subscribers. The communication enables the first online fitness coach to send third data to an individual remote subscriber in the first set in live-time.

DETAILED DESCRIPTION

With reference to the figures, where like elements have been given like numerical designations to facilitate an understanding of the present subject matter, the various embodiments for an online interactive fitness trainer are described.

The following description of the present subject matter is provided as an enabling teaching of the present subject matter and its best, currently-known embodiment. Those skilled in the art will recognize that many changes may be made to the embodiments described herein while still obtaining the beneficial results of the present subject matter. It will also be apparent that some of the desired benefits of the present subject matter may be obtained by selecting some of the features of the present subject matter without utilizing other features. Accordingly, those who work in the art will recognize that many modifications and adaptations of the present subject matter are possible and may even be desirable in certain circumstances and are part of the present subject matter. Thus, the following description is provided as illustrative of the principles of the present subject matter and not in limitation thereof. While the following exemplary discussion of embodiments of the present subject matter may be directed towards or references specific telecommunications systems, it is to be understood that the discussion is not intended to limit the scope of the present subject matter in any way and that the principles presented are equally applicable to other communications networks, systems and associated protocols.

Those skilled in the art will appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto. In addition, it is possible to use some of the features of the present subject matter without the corresponding use of the other features. Accordingly, the foregoing description of exemplary or illustrative embodiments is provided for the purpose of illustrating the principles of the present subject matter and not in limitation thereof and may include modification thereto and permutations thereof.

Figure 1:
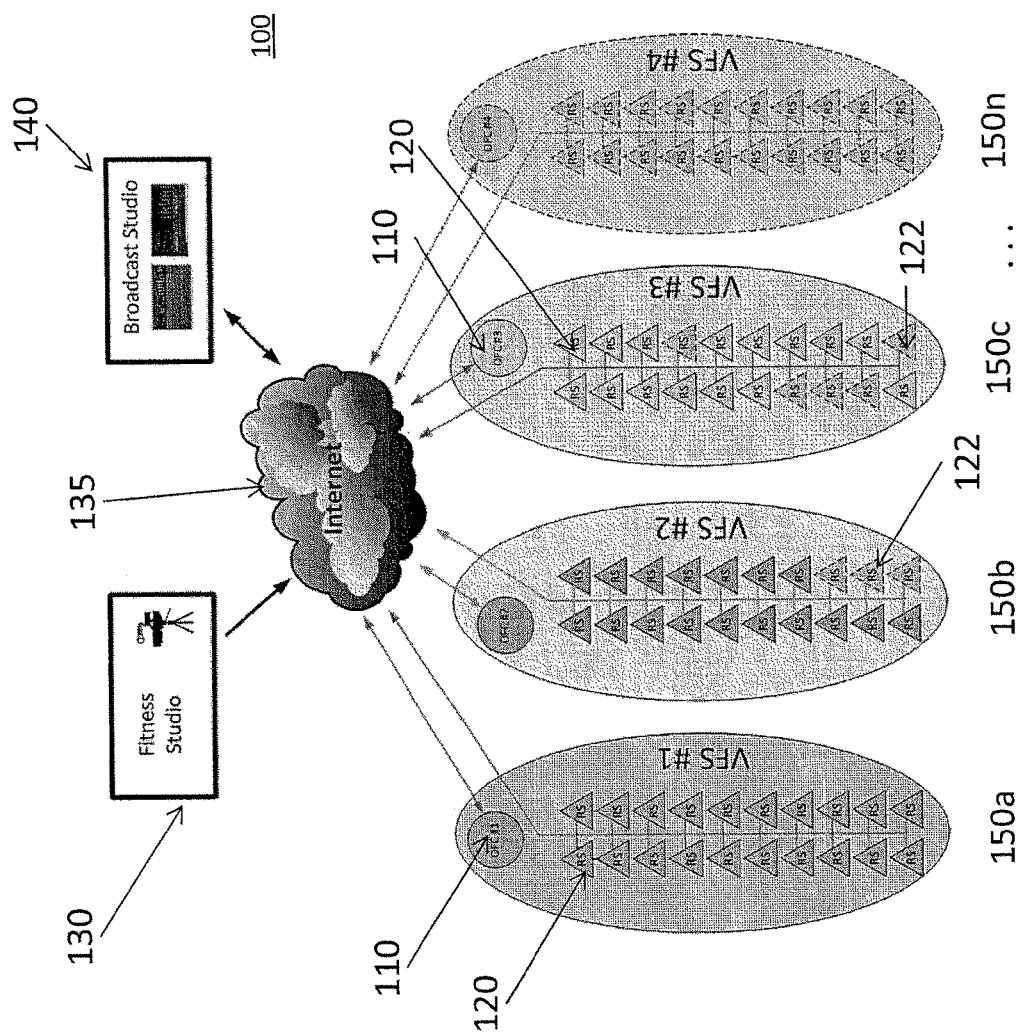
FIG. 1 is a simplified illustration of a system according to some embodiments of the present subject matter.

FIG. 1 is a simplified illustration of a system according to some embodiments of the present subject matter. With reference to FIG. 1, an exemplary online interactive fitness training system 100 may include one or more live and/or pre-recorded broadcasts streamed to a plurality of geographically remote and/or dispersed consumers. These consumers may include any number of online fitness coaches (OFC) 110 and remote subscribers (RS) 120 in any ratio. The ratio of online fitness coaches 110 to remote subscribers 120 depicted in FIG. 1 is a 1:20 ratio, however, embodiments of the present subject matter should not be so limited as any ratio is envisioned. Further, the ratio of online fitness coaches 110 to remote subscribers 120 may in some embodiments be a function of the type, intensity, demand, etc. of a specific fitness program or regime.

The system 100 includes a fitness studio 130 which may be a physical location having audio/visual equipment, lighting equipment, and any other equipment utilized to capture a fitness instructor facilitating a fitness class with participants, whether the participants are remote (e.g., remote subscribers 120) or proximate the fitness instructor in the fitness studio 130. The fitness studio 130 may broadcast the fitness class to a broadcast studio 140, which receives audio/visual and other feeds and controls and redistributes these audio/visual feeds to any number of online fitness coaches 110 and/or remote subscribers 120. The online fitness coaches 110 may be located anywhere in the world.

Although one or more online fitness coaches 110 may be in the fitness studio 130 in some embodiments, they do not have to be geographically near to the fitness studio 130 or the remote subscribers 120. The broadcast from the fitness studio 130 to the broadcast studio 140 may be a direct broadcast or may be a broadcast via a network, such as, but not limited to the Internet 135. While only one fitness studio 130 is illustrated, embodiments of the present subject matter should not be so limited, as a plurality of fitness studios and their associated audio and video feeds may be supported by a single or multiple broadcast studios 140.

In some embodiments, the broadcast studio 140 may split a received fitness studio broadcast into separate video and audio channels and then organize these separate video and audio streams to feed into any number (n) of virtual fitness sessions (VFS) 150a, 150b, 150c, . . . , 150n (collectively, "150"). Data for respective virtual fitness sessions 150 can originate from the same fitness studio (e.g., from a common broadcast from one fitness studio, or from respective broadcasts from one fitness studio) or from different fitness studios. The audio and/or video data that the broadcast studio 140 feeds to the virtual fitness sessions may be live data or pre-recorded data (e.g., a previously recorded fitness class from a fitness studio). A virtual fitness session 150 may be a cluster of connections characterized by one or more online fitness coaches 110 and a plurality of remote subscribers 120 analogous to a school classroom with one or more teachers and many students, each observing a video. In some embodiments, the broadcast studio 140 may assign an online fitness coach 110 to a respective virtual fitness session 150a and then set a time or deadline that each remote subscriber 120 can join that virtual fitness session 150a. If the time or deadline is passed and less than the predetermined ratio of remote subscribers 120 are present (e.g., depicted as a remote subscriber having an dashed outline 122), the virtual fitness session 150b may begin with less than a predetermined ratio of remote subscribers or may be delayed, as applicable. Additionally, if the virtual fitness session 150a is at capacity or meets the predetermined ratio, then the virtual fitness session may begin before or at the set time or deadline.

The broadcast studio 140 may then redistribute or provide any number or type of fitness studio video and/or audio streams to respective virtual fitness sessions 150. In one embodiment of the present subject matter, the broadcast studio 140 may allow a predetermined number (e.g., 10, 15, 20, or more) of remote subscribers 120 with one or more online fitness coaches 110 to be connected into one virtual fitness session 150 before forming another virtual fitness session. Exemplary online fitness coaches 110 may assist their respective remote subscribers 120 prior to the beginning of the live or pre-recorded class with questions and instructions about the specific workout. The online fitness coaches 110 may also continue to coach their respective remote subscribers 120 throughout the workout, e.g., using a bidirectional communication link, as the broadcast is being heard and viewed in any number of online fitness coach 110 and/or remote subscriber 120 locations.

Each remote subscriber 120 may possess one or more input devices that can capture data regarding that remote subscriber. For example, each remote subscriber 120 may have audio input equipment such as a microphone, video input equipment such as a camera (e.g., webcam), biometric input equipment such as a heart rate monitor, blood pressure monitor, calorie monitor that measures energy expenditure, grip strength monitor, movement monitor (e.g., for tracking a height or distance jumped, a distance walked or run, a force of a punch or kick thrown or received, any other parameter associated with a movement of the remote subscriber 12, etc.), or other input equipment such as a keyboard, mouse, trackball, touch screen connected to a computer or mobile electronic device, etc. For example, a smartphone having a microphone, a camera, or other input sensor(s) can be used for capturing data regarding the remote subscriber. Another example is a computer and/or one or more input sensors attached to a treadmill on which the remote subscriber is exercising. Various types of input devices can be used for capturing data regarding any aspect of a remote subscriber 120 or the performance of the remote subscriber 120 during exercise.

Regardless of the type(s) of input device(s) used (e.g., audio, video, or biometric input device), data gathered and conveyed from such input device(s) may be transmitted to the respective online fitness coach 110 over a feedback link (shown in FIG. 1 as arrows from the remote subscribers 120 and to the online fitness coaches 110). This feedback of data regarding the remote subscribers supports interactivity between the remote subscribers 120 and the respective online fitness coach 110. Each online fitness coach 110 may thus view, hear, and/or otherwise monitor (e.g., on the basis of biometric data) in live-time the condition or performance of his or her assigned remote subscribers 120 who are located remote from the fitness studio and/or the online fitness coach. For example, a remote subscriber 120 can manually provide feedback data to his or her online fitness coach 110 through audio data (e.g., by speaking into a microphone "I can't do this anymore"), by typing (e.g., "I could really feel it in my hamstrings on that last set"), by activating a touch screen (e.g., by pressing a virtual button that specifies that the present exercise is easy, moderately difficult, or hard), or by any other input mechanism. Or, feedback data regarding the condition or performance of a remote subscriber 120 can be automatically sent to his or her online fitness coach 110 based on the use of a camera/webcam or biometric sensor that is continuously monitoring the remote subscriber 120.

In these ways, the virtual fitness session can be interactive between each remote subscriber 120 and the online fitness coach 110. The online fitness coach 110 can communicate in live-time with one or more of the remote subscribers 120, e.g., by appropriately providing verbal encouragement and/or demonstrating how a remote subscriber 120 can improve his or her form during the performance of an exercise. The remote subscriber 120 can adjust accordingly, and the online fitness coach 110 can immediately track the results, promoting efficiency and high morale on the part of the remote subscriber.

Each remote subscriber 120 may be able to view (e.g., on a screen of a computer, mobile electronic device, smartphone, wristwatch display, headset display, or any other device having a display) some or all of his or her feedback data that is being sent to his or her online fitness coach 110. A remote subscriber 120 who sees that his or her heart rate is dropping during a cardiovascular-oriented exercise that is expected to be performed at a high heart rate may quickly adapt his or her performance accordingly. The knowledge that the remote subscribers 120 are under the scrutiny of a live online fitness coach, who can communicate in live-time with the remote subscribers, typically prods the remote subscribers to pay more attention to the relevant exercises and exert more effort than would be the case without an online fitness coach.

In various embodiments, the broadcast studio 140 may control interactive sessions between remote subscribers 120 and online fitness coaches 110 during the live or prerecorded broadcast to thereby allow each online fitness coach 110 to visually and audibly interact with his or her remote subscribers 120 without interrupting the live or pre-recorded broadcast from the broadcast studio 140. Thus, in some embodiments the online fitness coach 110 may have a plurality of interactive feeds or communication sessions, e.g., one for each remote subscriber 120, in the coach's assigned virtual fitness session. The interactive feeds may be capable of bidirectionally transmitting data, e.g., audio and/or video data. Any number or all of these feeds may be monitored and/or controlled by the broadcast studio 140. In this way, the online fitness coach 110 may focus on a particular user. Such individualized attention may be beneficial, for example, if one remote subscriber 120 is lagging behind others regarding performance of an exercise. The online fitness coach 110 can thus discreetly provide encourage, guidance, constructive criticism, or other feedback to a single remote subscriber 120 without concerns about causing embarrassment as in a traditional gym setting. Or, if only one remote subscriber 120 is requesting assistance from the online fitness coach 110 at a given time (e.g., by speaking "Am I doing this correctly?" or pressing a button on a display marked "Check my form"), the individual interactive feed between that remote subscriber 120 and the online fitness coach 110 can enable the online fitness coach 110 to provide the requested assistance or instruction in a tailored manner without distracting the other remote subscribers 120.

In other embodiments, the online fitness coach 110 may have multiple interactive feeds, with at least one feed being configured for interactive communication with more than one but fewer than all of his or her corresponding remote subscribers 120. Thus, interactive feeds between the online fitness coach 110 and various subsets of the remote subscribers 120 can be flexibly configured to meet changing circumstances. For example, the online fitness coach 110 may use one feed for providing guidance to male remote subscribers and another feed for providing guidance to female remote subscribers, Or, the online fitness coach may use different feeds for providing guidance to adults and children, respectively.

In other embodiments of the present subject matter, the online fitness coach 110 may have a single interactive feed covering all remote subscribers 120, which may allow the online fitness coach 110 to monitor all the remote subscribers 120 in the virtual fitness session 150 as a whole. Such a single interactive feed may be monitored and/or controlled by the broadcast studio 140. For example, the broadcast studio 140 may enable, disable, raise, lower the volume of the streaming exercise audio and may employ and distribute exercise music (streamed from the fitness studio 130 or from an independent source). The broadcast studio 140 may also synchronize audio and visual data streams sent to any number of virtual fitness sessions 150 so that in the event connectivity to any one virtual fitness session or any subscriber, coach or user is interrupted or severed, connectivity to another synchronized stream of audio and/or visual feed for the same exercise or workout regime may be established in a substantially seamless fashion.

Thus, each online fitness coach 110 may monitor in live-time all corresponding remote subscribers 120, a single remote subscriber, or any subset of the remote subscribers. Similarly, the online fitness coach 110 can communicate in live-time with all remote subscribers 120 in the virtual fitness session 150 at once (i.e., a broadcast communication), can communication with a single remote subscriber 120 (unicast communication), or can communicate with any subset of the remote subscribers (multicast communication). Hence, various embodiments provide flexibility in how the inputs to the online fitness coach 110 and the outputs from the online fitness coach 110 may be configured and used.

In additional embodiments, an exemplary fitness studio 130 may directly interact with the online community on special occasions at the discretion of the fitness studio. In other embodiments, this interaction may remain the responsibility of each online fitness coach 110 to his or her assigned remote subscribers 120. At any time, the broadcast studio 140 may reassign any or all members (i.e., remote subscribers 120 and/or online fitness coaches 110) in a virtual fitness session 150 to another existing virtual fitness session 150 as long as the other virtual fitness session 150 has an online fitness coach 110 and/or available remote subscriber 120 positions.

Figure 2:
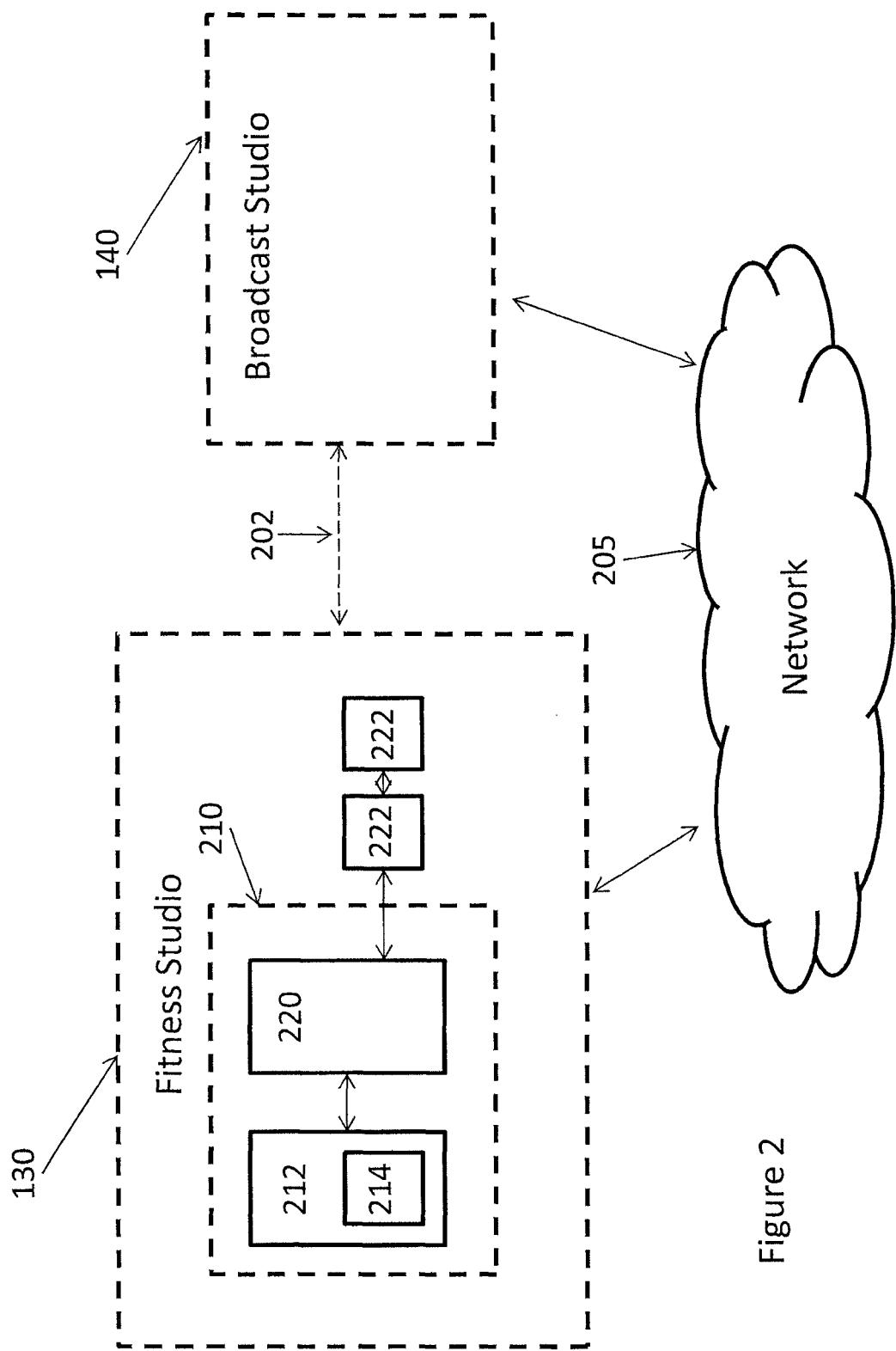
FIG. 2 is an illustration of a fitness studio according to some embodiments of the present subject matter.

FIG. 2 is an illustration of a fitness studio according to some embodiments of the present subject matter. With reference to FIG. 2, a fitness studio 130 may be a physical location having audio/visual equipment, lighting equipment, and other necessary equipment to capture a fitness instructor facilitating a fitness class with participants, whether the participants are remote or proximate the fitness instructor in the fitness studio 130. The fitness studio 130 may broadcast the fitness class to a broadcast studio 140 which receives audio/visual and other feeds therefrom. This broadcast may be direct 202 or may be via a network 205 such as, but not limited to, the Internet, a wide area network, a local area network and the like. The fitness studio 130 may include a server system 210 having a database server 212 for storing information in a database 214 and a web server 220 for storing instructions necessary to access and present information from the database server 212. The fitness studio 130 may also include various input/output (I/O) components 222 which pass data including, but not limited to, audio and visual data from audio/visual equipment, lighting equipment, and other necessary equipment in the fitness studio 130. The functionality provided by the database server 212 and web server 220 may be implemented using a computer system having characteristics as described below. Further, the functionality provided by the database server 212 and web server 220 may be combined in one computer system or distributed over several computers.

Figure 3:
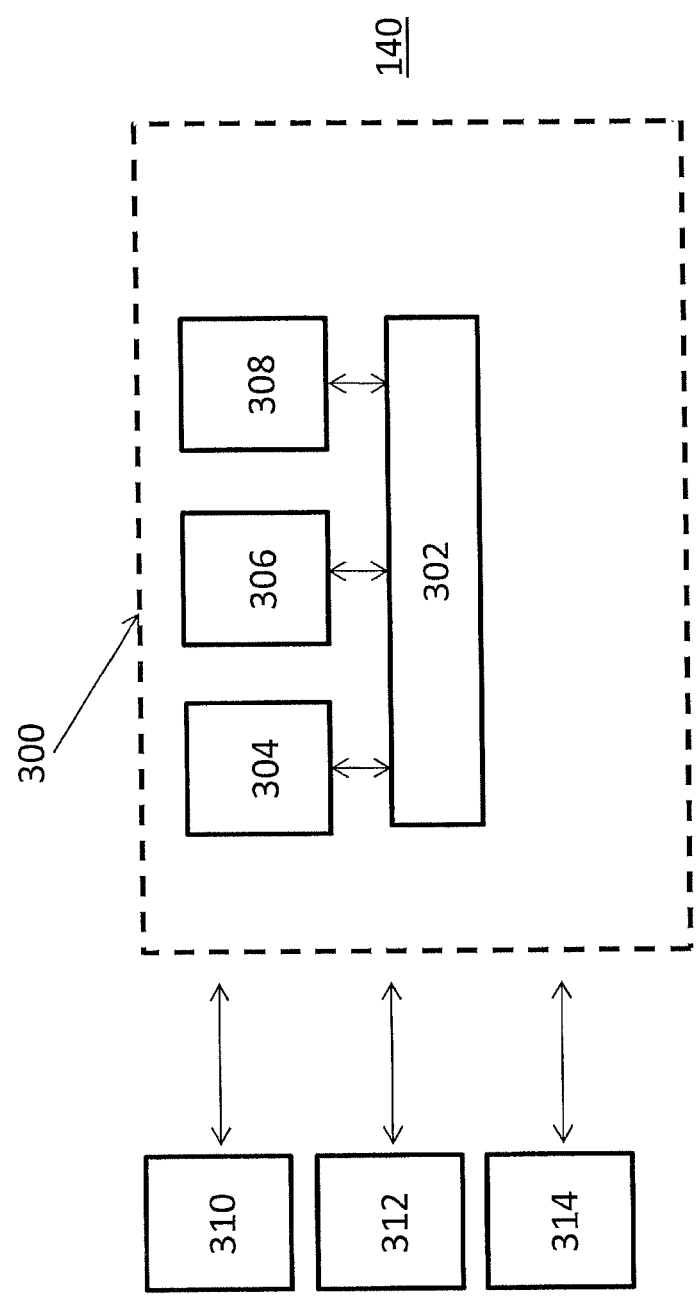
FIG. 3 is an illustration of a broadcast studio according to some embodiments of the present subject matter.

FIG. 3 is an illustration of a broadcast studio according to some embodiments of the present subject matter. With reference to FIG. 3, a broadcast studio 140 may include a computer system 300 having a bus 302 for communicating information between components of the system 300 and a processor 304 coupled with the bus 302 for executing software code, instructions, and processing information. The computer system 300 may include a main memory component 306 which includes random access memory (RAM), read only memory (ROM), and/or other memory storage devices for storing information and instructions to be executed by the processor 304. In other embodiments, mass storage devices 308 (e.g., magnetic disk drives and/or optical disk drives) may be coupled to the computer system 300 for storing information and instructions. Additional components may be coupled to the computer system 300 including, but not limited to, display devices 310 (e.g., liquid crystal displays (LCD) and the like) for displaying graphical or textual information to a user in the broadcast studio and input devices 312 (e.g., keyboards, mouse, touch mouse, trackball, track pad or other cursor control devices, and the like) for communicating information and/or commands to the processor 304. The system 300 may also include a communications device or interface 314 which communicates with a network and/or the fitness studio to receive audio, visual and other data from the fitness studio and to transmit or distribute audio, visual and other data to remote subscribers, online fitness coaches, etc. The communications device 314 may include in some embodiments a modem, a network interface card, or other well-known interface devices, such as those used for interfacing with the Internet or other types of networks. In any event, in this manner, the computer system 300 may be coupled to a number of other computer systems via an exemplary network infrastructure. In some embodiments, the system 300 includes a web server or database server as discussed above and thus a user may interact online fitness coaches and/or remote subscribers through exemplary graphical user interfaces implemented, for example, using one or more web pages, screens, etc.

Embodiments of the present subject matter may thus provide methods and systems of providing physical fitness classes that allow close interaction with a remote individual or client to achieve consistent results by streaming and receiving live or pre-recorded fitness classes over a network. Such embodiments may provide a high degree of interactivity to a remote subscriber through the addition of online fitness coaches at the same time a studio or fitness instructor is providing a fitness regime. Such embodiments providing an online method of delivering fitness classes with live online coaching may thus appeal to many more people who are unable to attend studio fitness classes due to various reasons. It is thus an aspect of some embodiments of the present subject matter to provide accountability for a client through integration of live, dedicated online coaches awaiting subscribers to log in. It is another aspect of embodiments of the present subject matter to provide a conducive environment for someone to learn and practice consistency in his or her respective fitness journey by creating an environment in which a live online coach teaches subscribers how to practice and remain consistent as a function of encouragement before, during and after the workout session.

It is also an aspect of embodiments of the present subject matter to provide clear instructions on how to perform each and every exercise during the workout especially for those persons unfamiliar with exercise routines. Exemplary embodiments may provide online sessions with studio demonstrations before the beginning of each exercise in addition to a live online coach providing real-time feedback regarding how exercises should be performed as the workout progresses. Additional aspects of embodiments of the present subject matter include providing personal interactivity with a plurality of online subscribers through two-way interactive video and audio communication with each subscriber who has an appropriately functioning microphone and/or webcam. A further aspect of embodiments of the present subject matter may also provide technical support for online subscribers wishing to connect to the online fitness classes through the use of a dedicated technical staff providing setup instructions and full live testing with each subscriber before attempts to connect to a online fitness session are made. Another aspect of embodiments of the present subject matter may create and encourage instructor-to-client bonds essential for remaining committed to a fitness lifestyle. This aspect is provided using a live online coach who works to build a personal bond and camaraderie with each subscriber which dramatically shifts the focus away from just another exercise regime toward an ongoing fitness lifestyle. It is thus an aspect of embodiments to provide the necessary elements for clients to remain motivated, committed and accountable yet no longer restricted by geographical or scheduling boundaries by delivering a fitness class broadcast with live personalized and interactive online coaching to any subscriber with network connectivity. Furthermore, exemplary systems may transcend the boundaries of any physical location and space and therefore scale to unprecedented levels, all potentially from a single fitness studio with virtual fitness sessions.

Figure 4:
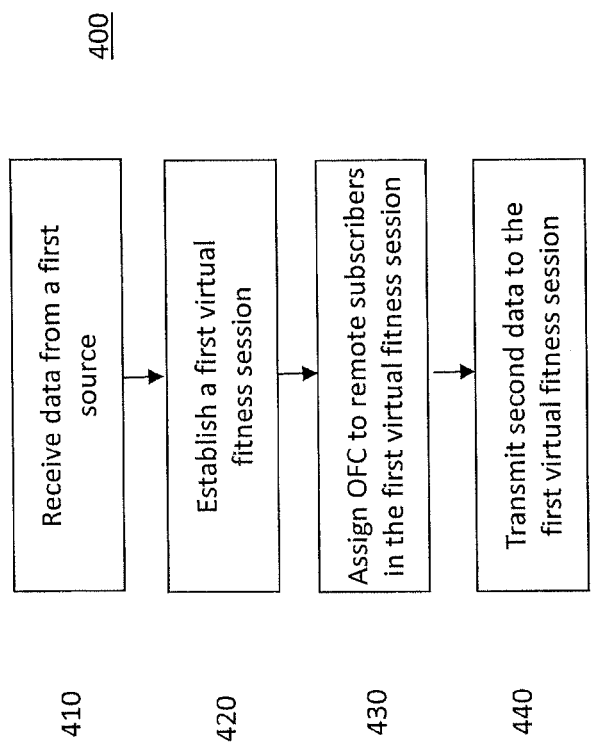
FIG. 4 is a flow diagram of a process in accordance with some embodiments of the present subject matter.

FIG. 4 is a flow diagram of a process in accordance with some embodiments of the present subject matter. With reference to FIG. 4, a method 400 for providing a fitness program to remote users is provided. At step 410 first data from a first source may be received, the first data related to a first fitness program. In various embodiments, step 410 may include receiving first data directly from a fitness studio or receiving first data from a fitness studio via a network. Exemplary networks include, but are not limited to, the Internet, a WAN, a LAN, etc. At step 420, a first virtual fitness session having a first set of remote subscribers may be established and at step 430 a first online fitness coach is assigned to the first set of remote subscribers in the first virtual fitness session. These one or more subscribers in the first set may be at locations remote from either the first source, the second source or both. In further embodiments, step 420 may include assigning the first online fitness coach to the first set of remote subscribers using a predetermined ratio. This ratio may be one online fitness coach to twenty remote subscribers and/or may be determined as a function of the type, intensity and/or demand of the fitness program.

At step 440 second data from a second source may then be transmitted to the first virtual fitness session, the second data including data related to the first fitness program. In some embodiments, the first data is audio and visual data of the first fitness program. In other embodiments, the second data is the same as the first data. In some embodiments, the second source is a broadcast studio. Another embodiment may include the step of controlling the transmitted second data to the first virtual fitness session. In yet a further embodiment of the present subject matter, the method 400 may include receiving third data from a third source, the third data related to a second fitness program, establishing a second virtual fitness session having a second set of remote subscribers, assigning a second online fitness coach to the second set of remote subscribers in the second virtual fitness session, and transmitting fourth data from the second source to the second virtual fitness session, the fourth data including data related to the second fitness program. The first and third sources may be different fitness studios. In an alternative embodiment, the method 400 may include establishing a second virtual fitness session having a second set of remote subscribers, assigning a second online fitness coach to the second set of remote subscribers in the second virtual fitness session, and transmitting second data from the second source to the second virtual fitness session, the second data including data related to the first fitness program. An additional embodiment may include the step of providing interactivity between the first online fitness coach and any number of remote subscribers in the first set.

Figure 5:
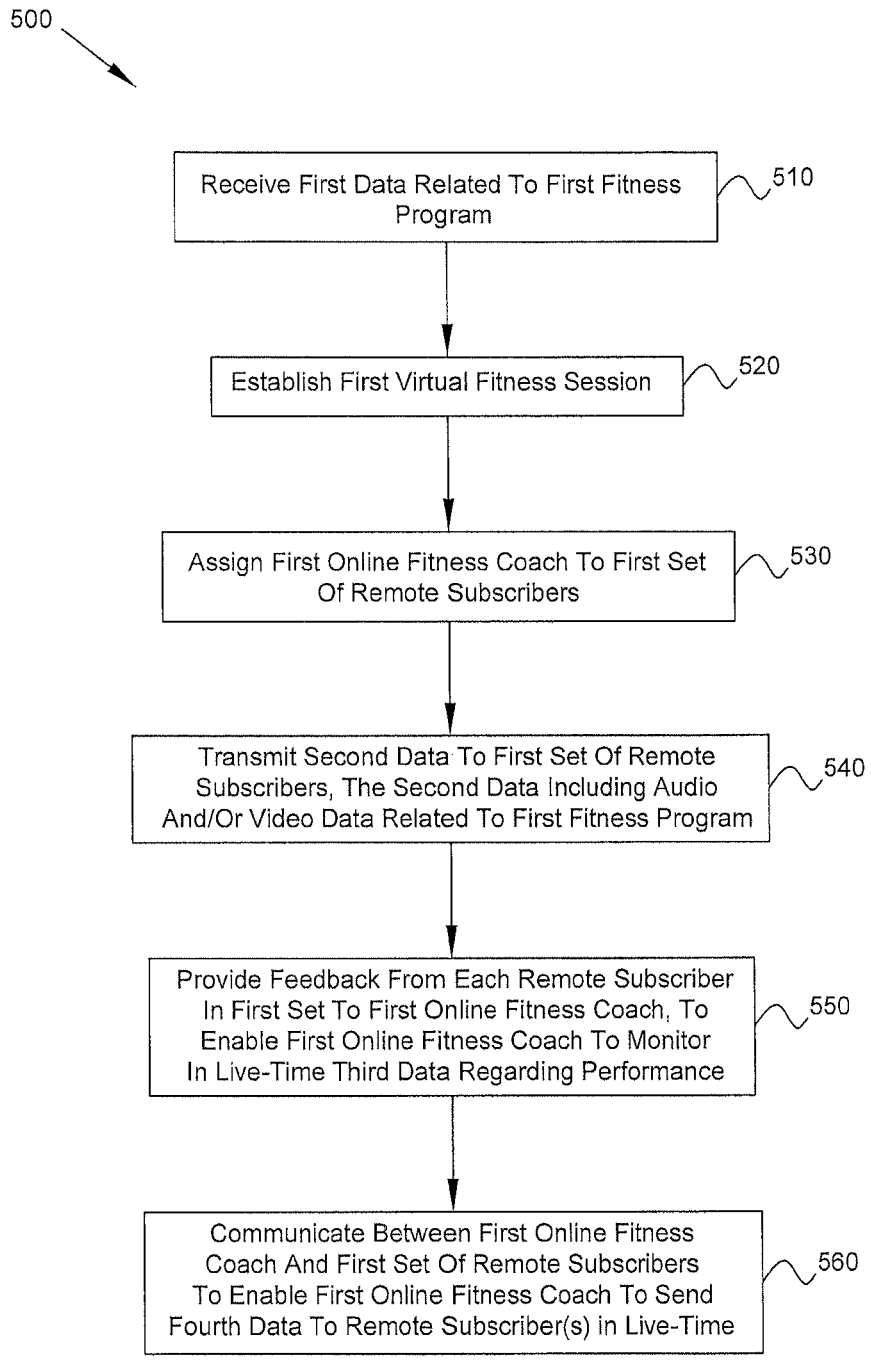
FIG. 5 is a flow diagram of another process in accordance with some embodiments of the present subject matter.

FIG. 5 is a flow diagram of a process in accordance with some embodiments. First data related to a first fitness program is received at step 510. A first virtual fitness session having a first set of remote subscribers is established at step 520. At step 530, a first online fitness coach is assigned to the first set of remote subscribers in the first virtual fitness session. At step 540, second data is transmitted to the first set of remote subscribers in the first virtual fitness session. The second data includes at least one of audio data and video data related to the first fitness program. At step 550, feedback is provided from each remote subscriber in the first set to the first online fitness coach. The feedback enables the first online fitness coach to monitor in live-time third data regarding performance of each remote subscriber in the first virtual fitness session. Step 560 includes communicating between the first online fitness coach and the first set of remote subscribers. The communication enables the first online fitness coach to send fourth data to one or more of the remote subscribers in the first set in live-time.

Figure 6:
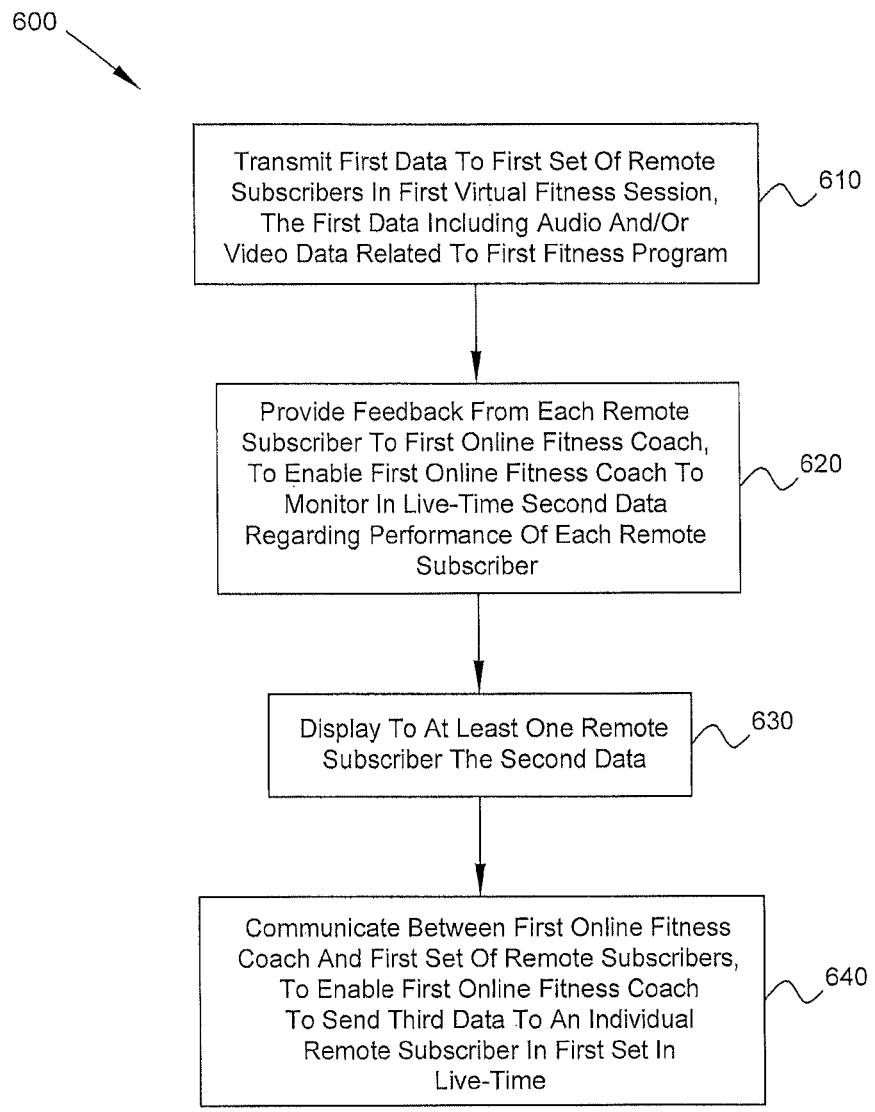
FIG. 6 is a flow diagram of another process in accordance with some embodiments of the present subject matter.

FIG. 6 is a flow diagram of a process in accordance with some embodiments. At step 610, first data is transmitted to a first set of remote subscribers in a first virtual fitness session. The first data includes at least one of audio data and video data related to a first fitness program. At step 620, feedback is provided from each remote subscriber in the first set to an first online fitness coach assigned to the first set of remote subscribers. The feedback enables the first online fitness coach to monitor in live-time second data regarding performance of each remote subscriber in the first virtual fitness session. Step 630 includes displaying to at least one remote subscriber in the first set the second data regarding the performance of said at least one remote subscriber. Step 640 includes communicating between the first online fitness coach and the first set of remote subscribers. The communication enables the first online fitness coach to send third data to an individual remote subscriber in the first set in live-time.

Additional embodiments of the present subject matter may provide a computer system for providing a fitness program to remote users. The system may include a computer readable storage medium being encoded with computer program code and a processor electrically coupled with the computer readable storage medium, the processor being configured to execute the computer program code for providing a fitness program to remote users. The computer program code may be arranged to cause the processor to receive first data from a first source, the first data related to a first fitness program and establish a first virtual fitness session having a first set of remote users. This first data may be received directly from a fitness studio or received from a fitness studio via a network. Exemplary networks include, but are not limited to, the Internet, a WAN, a LAN, etc. These one or more remote users in the first set may be at locations remote from either the first source, the second source or both.

The computer program code may also be arranged to cause the processor to assign a first online fitness coach to the first set of remote users in the first virtual fitness session and transmit second data from a second source to the first virtual fitness session, the second data including data related to the first fitness program. In some embodiments, the first data is audio and visual data of the first fitness program. In other embodiments, the second data is the same as the first data. In some embodiments, the second source is a broadcast studio. In some embodiments, the processor may further be configured to assign the first online fitness coach to the first set of remote users using a predetermined ratio. This ratio may be one online fitness coach to twenty remote users and/or may be determined as a function of the type, intensity and/or demand of the fitness program. In another embodiment, the processor may be configured to control the transmitted second data to the first virtual fitness session. In yet a further embodiment of the present subject matter, the processor may be configured to receive third data from a third source, the third data related to a second fitness program, establishing a second virtual fitness session having a second set of remote users, assigning a second online fitness coach to the second set of remote users in the second virtual fitness session, and transmitting fourth data from the second source to the second virtual fitness session, the fourth data including data related to the second fitness program. The first and third sources may be different fitness studios. In an alternative embodiment, the processor may be configured to establish a second virtual fitness session having a second set of remote users, assigning a second online fitness coach to the second set of remote users in the second virtual fitness session, and transmitting second data from the second source to the second virtual fitness session, the second data including data related to the first fitness program. In an additional embodiment, the processor may be configured to provide interactivity between the first online fitness coach and any number of remote users in the first set.

As noted above, the present disclosure may be implemented by a general purpose computer programmed in accordance with the principals discussed herein. It may be emphasized that the above-described embodiments, particularly any "preferred" or exemplary embodiments, are merely possible examples of implementations, merely set forth for a clear understanding of the principles of the present subject matter. Many variations and modifications may be made to the above-described embodiments of the present subject matter without departing substantially from the spirit and principles of the present subject matter. All such modifications and variations are intended to be included herein within the scope of this present subject matter.

Embodiments of the subject matter and the functional operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer program products, i.e., one or more modules of computer program instructions encoded on a tangible program carrier for execution by, or to control the operation of data processing apparatus. The tangible program carrier may be a computer readable medium. The computer readable medium may be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network or as an app on a mobile device such as a tablet, PDA or phone.

The processes and logic flows described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, to name just a few.

Computer readable media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described herein may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, input from the user may be received in any form, including acoustic, speech, or tactile input.

Embodiments of the subject matter described herein may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described herein, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this description may contain many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

While this description may contain many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

As shown by the various configurations and embodiments illustrated in FIGS. 1-6, various embodiments for an online interactive fitness trainer have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

I claim:

1. A method for providing a fitness program to remote subscribers, the method comprising:
   receiving first data related to a first fitness program;
   establishing a first virtual fitness session having a first set of remote subscribers;
   assigning a first online fitness coach to the first set of remote subscribers in the first virtual fitness session, wherein communication is enabled between the first online fitness coach and each remote subscriber in the first set of remote subscribers via a computer network;
   transmitting second data to the first set of remote subscribers in the first virtual fitness session via the computer network, the second data including at least one of audio data and video data related to the first fitness program;
   providing feedback from each remote subscriber in the first set to the first online fitness coach via the computer network, the feedback enabling the first online fitness coach to monitor in live-time, via the computer network, third data regarding performance of each remote subscriber in the first virtual fitness session, wherein the third data regarding the performance of at least one remote subscriber is obtained from at least one of a camera, a microphone, and a biometric sensor; and
   communicating between the first online fitness coach and the first set of remote subscribers via the computer network, wherein the communication enables the first online fitness coach to send fourth data to one or more of the remote subscribers in the first set in live-time.

2. The method of claim 1, including communicating between the first online fitness coach and all the remote subscribers in the first set simultaneously.

3. The method of claim 1, including communicating between the first online fitness coach and an individual remote subscriber in the first set.

4. The method of claim 1, including communicating between the first online fitness coach and N remote subscribers in the first set simultaneously, wherein N is an integer greater than 1 and less than the number of remote subscribers in the first set.

5. The method of claim 1, further comprising displaying to at least one remote subscriber the third data regarding the performance of said at least one remote subscriber.

6. The method of claim 1, wherein the biometric sensor is a heart rate monitor.

7. The method of claim 1, wherein the biometric sensor is a blood pressure monitor.

8. The method of claim 1, wherein the biometric sensor is a blood pressure monitor.

9. The method of claim 1, wherein the biometric sensor is configured to measure at least one parameter associated with movement of the at least one remote subscriber.

10. The method of claim 1, further comprising:
    receiving fifth data related to a second fitness program;
    establishing a second virtual fitness session having a second set of remote subscribers;
    assigning a second online fitness coach to the second set of remote subscribers in the second virtual fitness session;
    transmitting sixth data to the second set of remote subscribers in the second virtual fitness session, the sixth data including at least one of audio data and video data related to the second fitness program;
    providing feedback from each remote subscriber in the second set to the second online fitness coach, the feedback from the remote subscribers in the second set enabling the second online fitness coach to monitor in live-time seventh data regarding the performance of each remote subscriber in the second set; and
    communicating between the second online fitness coach and the second set of remote subscribers to enable the second online fitness coach to send eighth data to one or more of the remote subscribers in the second set in live-time.

11. The method of claim 10, wherein the first data and fifth data are received from a first fitness studio and a second fitness studio, respectively.

12. The method of claim 1, further comprising:
    establishing a second virtual fitness session having a second set of remote subscribers;
    assigning a second online fitness coach to the second set of remote subscribers in the second virtual fitness session;
    transmitting the second data to the second set of remote subscribers in the second virtual fitness session;
    providing feedback from each remote subscriber in the second set to the second online fitness coach, the feedback from the remote subscribers in the second set enabling the second online fitness coach to monitor in live-time fifth data regarding performance of each remote subscriber in the second set in the second virtual fitness session; and
    communicating between the second online fitness coach and the second set of remote subscribers to enable the second online fitness coach to send sixth data to one or more of the remote subscribers in the second set in live-time.

13. A computer system for providing a fitness program to remote users comprising:
    a computer readable storage medium encoded with computer program code; and
    a processor electrically coupled with the computer readable storage medium, the processor being configured to execute the computer program code for providing a fitness program to remote users, the computer program code being arranged to cause the processor to:
    receive first data related to a first fitness program;
    establish a first virtual fitness session having a first set of remote subscribers;
    transmit second data to the first set of remote subscribers in the first virtual fitness session via a computer network, the second data including at least one of audio data and video data related to the first fitness program;
    receive, via the computer network, feedback from each remote subscriber in the first set at a first online fitness coach assigned to the first set of remote subscribers in the first virtual fitness session, the feedback enabling the first online fitness coach to monitor in live-time third data regarding performance of each remote subscriber in the first virtual fitness session, wherein the third data regarding the performance of at least one remote subscriber is obtained from at least one of a camera, a microphone, and a biometric sensor; and
    communicate between the first online fitness coach and the first set of remote subscribers via the computer network, wherein the communication enables the first online fitness coach to send fourth data to one or more of the remote subscribers in the first set via the computer network in live-time.

14. The computer system of claim 13, wherein the computer program code is further arranged to cause the processor to:
display to at least one remote subscriber in the first set the third data regarding the performance of said at least one remote subscriber.

15. The computer system of claim 13, wherein the computer program code is further arranged to cause the processor to:
establish a second virtual fitness session having a second set of remote subscribers;
assign a second online fitness coach to the second set of remote subscribers in the second virtual fitness session;
transmit the second data to the second set of remote subscribers in the second virtual fitness session;
provide feedback from each remote subscriber in the second set to the second online fitness coach, the feedback from the remote subscribers in the second set enabling the second online fitness coach to monitor in live-time fifth data regarding performance of each remote subscriber in the second set in the second virtual fitness session; and
communicate between the second online fitness coach and the second set of remote subscribers to enable the second online fitness coach to send sixth data to one or more of the remote subscribers in the second set in live-time.

16. A method for providing a fitness program to remote subscribers, the method comprising:
transmitting first data to a first set of remote subscribers in a first virtual fitness session, the first data including at least one of audio data and video data related to a first fitness program;
providing feedback from each remote subscriber in the first set to an first online fitness coach assigned to the first set of remote subscribers, the feedback enabling the first online fitness coach to Monitor in live-time second data regarding performance of each remote subscriber in the first virtual fitness session, wherein the second data regarding the performance of at least one remote subscriber is obtained from at least one of a camera, a microphone, and a biometric sensor;
displaying to at least one remote subscriber in the first set the second data regarding the performance of said at least one remote subscriber; and
communicating between the first online fitness coach and the first set of remote subscribers, wherein the communication enables the first online fitness coach to send third data to an individual remote subscriber in the first set in live-time.

17. The method of claim 16, further comprising:
transmitting fourth data to a second set of remote subscribers in a second virtual fitness session, the fourth data including at least one of audio data and video data related to the first fitness program or a second fitness program;
providing feedback from each remote subscriber in the second set to a second online fitness coach assigned to the second set of remote subscribers, the feedback from the remote subscribers in the second set enabling the second online fitness coach to monitor in live-time fifth data regarding performance of each remote subscriber in the second set in the second virtual fitness session; and
communicating between the second online fitness coach and the second set of remote subscribers to enable the second online fitness coach to send sixth data to one or more of the remote subscribers in the second set in live-time.

* * * * *